US006763482B2

(12) United States Patent
Bernklau-halvor

(10) Patent No.: US 6,763,482 B2
(45) Date of Patent: Jul. 13, 2004

(54) PRINTER DIAGNOSTICS METHOD

(75) Inventor: David I. Bernklau-halvor, Portland, OR (US)

(73) Assignee: Xerox Corporation, Stamford, CT (US)

( * ) Notice: Subject to any disclaimer, the term of this patent is extended or adjusted under 35 U.S.C. 154(b) by 561 days.

(21) Appl. No.: 09/886,449

(22) Filed: Jun. 19, 2001

(65) Prior Publication Data

US 2002/0194536 A1 Dec. 19, 2002

(51) Int. Cl.[7] .................................................. G06F 11/00
(52) U.S. Cl. .............................. 714/25; 714/26; 714/44
(58) Field of Search .............................. 714/25, 26, 44, 714/57, 48, 46; 347/19

(56) References Cited

U.S. PATENT DOCUMENTS 4,586,147 A * 4/1986 Tadokoro .................... 702/184
5,001,655 A * 3/1991 Higano et al. .............. 702/108
5,200,958 A * 4/1993 Hamilton et al. ............. 714/45
5,202,726 A * 4/1993 McCulley et al. ............ 399/11
5,239,547 A * 8/1993 Tomiyama et al. ........... 714/26
5,243,382 A * 9/1993 Takano et al. ................. 399/8
5,317,368 A * 5/1994 Shimomura et al. .......... 399/12
5,357,519 A * 10/1994 Martin et al. ................. 714/25
5,533,193 A * 7/1996 Roscoe ........................ 714/39
5,768,495 A 6/1998 Campbell et al. ...... 395/183.01
6,353,899 B1 * 3/2002 Martin et al. ................ 714/57

OTHER PUBLICATIONS

U.S. patent application Ser. No. 09/886,325, Neville, filed Jun. 19, 2001.

U.S. patent application Ser. No. 09/886,453, Halvor, filed Jun. 19, 2001.

* cited by examiner

*Primary Examiner*—Robert Beausoliel
*Assistant Examiner*—Yolanda L Wilson
(74) *Attorney, Agent, or Firm*—Jeannette Walder

(57) ABSTRACT

A method of diagnosing a printer includes performing a series of parametric tests on the printer at the time of manufacture to generate a set of baseline values for the printer and storing the baseline results. The baseline results may be stored remotely or with the printer, or both. A set of maximum parametric test variations for the printer type is generated, such that each maximum parametric test variation is associated with a particular printer fault event. At the time of a suspected printer fault, the same parametric tests are performed and a set of suspected fault values generated. The difference between the suspected fault value and the baseline value is calculated for each parametric test. If the difference for a particular parametric test is greater than the maximum parametric test variation for that particular parametric test, the print fault event associated with the parametric test value may be indicated.

7 Claims, 2 Drawing Sheets

PRINTER DIAGNOSTICS METHOD

FIELD OF THE INVENTION

This invention relates generally to a method of diagnosing printer problems in order to effectuate repair.

BACKGROUND OF THE INVENTION

The high degree of complexity of reproduction machines, printers, copiers and the like complicates the detection and identification of problems and repair and service. Service technicians typically use a parametric diagnostic tool (or code) to evaluate operation of the device. These parametric diagnostic tools may reside in the device or may be downloaded by a service technician at the time of service. If the diagnostic tools are downloaded on the device at the time of field servicing, a computer or internet connection is typically required. U.S. Pat. No. 5,768,495 describes a system by which a printer could be serviced in a remote location by downloading full diagnostic code to the printer from a portable device without having to directly connect the printer to a computer.

Having parametric diagnostics built into the printer eliminates the need for a co-located computer, portable device or internet connection. However, the parametric diagnostics tests frequently provided only limited troubleshooting assistance and were not able to reduce service costs significantly. Interpreting field generated parametric test data and troubleshooting field failures becomes difficult data without any baseline printer behavior information. Printer specific data gathered during manufacturing, if it exists at all, is only available via a separate query (the service technician calls the factory for the information) or the field technician must remove the printer for in-factory failure analysis.

Even having the printer specific data gathered during manufacture for the particular model of printer may not be useful in interpreting field test results. Such manufacturing data for mass-produced, low cost printers, typically produces a wide range of acceptable results. The field measured value of a particular test for a particular printer may be associated with a failure and yet may fall within the range of acceptable manufacturing results. There is a need for a printer diagnostic method which overcomes the problems of prior methods.

SUMMARY OF THE INVENTION

A method of diagnosing a printer, according to the invention, where the printer is one of a particular type, includes performing a series of parametric tests on the printer at the time of manufacture to generate a set of baseline values for the printer and storing the baseline results. The baseline results may be stored remotely or with the printer, or both. A set of maximum parametric test variations for the printer type is generated, such that each maximum parametric test variation is associated with a particular printer fault event. At the time of a suspected printer fault, the same parametric tests are performed and a set of field values generated. The difference between the field value and the baseline value is calculated for each parametric test. If the difference for a particular parametric test is greater than the maximum parametric test variation for that particular parametric test, the particular print fault event associated with the parametric test value may be indicated.

Software for performing the parametric testing may be stored on the printer so that personnel may perform the tests directly on the printer in the field. Alternatively, the testing may be run remotely from a factory, for example. Each time the set of parametric tests is performed, the results may be stored with the baseline values to keep a historical record of the printer's performance. This information may be used to determine or anticipate (if the difference between a measured value and the baseline value approaches the maximum parametric variation) a particular type of printer fault.

The maximum parametric test variation is the difference between a baseline value and a measured value at the time of a known printer fault. The maximum parametric test variation may be determined from one or more test printers. The set of maximum parametric test variations may be generated in accordance with the following: providing at least one other printer of the same printer type; performing at least one parametric test on the other printer at the time of manufacture to generate a baseline value for that parametric test for the other printer; causing a fault of a known type in the other printer; performing the parametric test on the other printer to generate a fault value; calculating the difference between the fault value and the baseline value; associating the difference with the fault of the known type. If multiple printers are used, an average of all the individual maximum parametric test variations may be used.

DETAILED DESCRIPTION OF THE PREFERRED EMBODIMENTS

The method of the invention improves printer problem diagnosing and trouble shooting effectiveness by comparing parametric test data gathered from the printer in the manufacturing process to results of the same tests performed in the field. The parametric tests are performed on each individual printer at the time of manufacture and this data is stored in a database. Examples of some of the parametric tests include: motor frequency measurement, process event timing, paper path motion timing, and range of motion measurement. One or more of these parametric tests may be built-into the printer, or the tests may be downloaded at the printer site at the time of a service call. When a service technician runs the tests at the printer in the field, test results are generated. The test results may be a numeric value or some other value indication depending on the type of test being run.

At any future time these same test functions can be run in the field, and the service technician has the ability to query the manufacturing database to compare the results of the field measured values to the baseline values stored for that particular printer. The baseline value measured for the particular printer is used instead of a population determined average (such as could be obtained by collecting data for a population of printers of the same type and using that as the baseline rather than the individual printer). The problem with using a population determined average is that the range of test results for the population may be greater than the change that a single printer would experience due to a failure.

The difference between the two values is calculated. This difference value is compared with a maximum parametric test variations determined for the model or type of printer. If the difference for any given parametric test is greater than the maximum parametric test variation for that test, the failure mode associated with that test is indicated. Testing done prior to product launch correlates changes in the test data to product failure modes so that product repair is faster and more precise.

Figure 1:
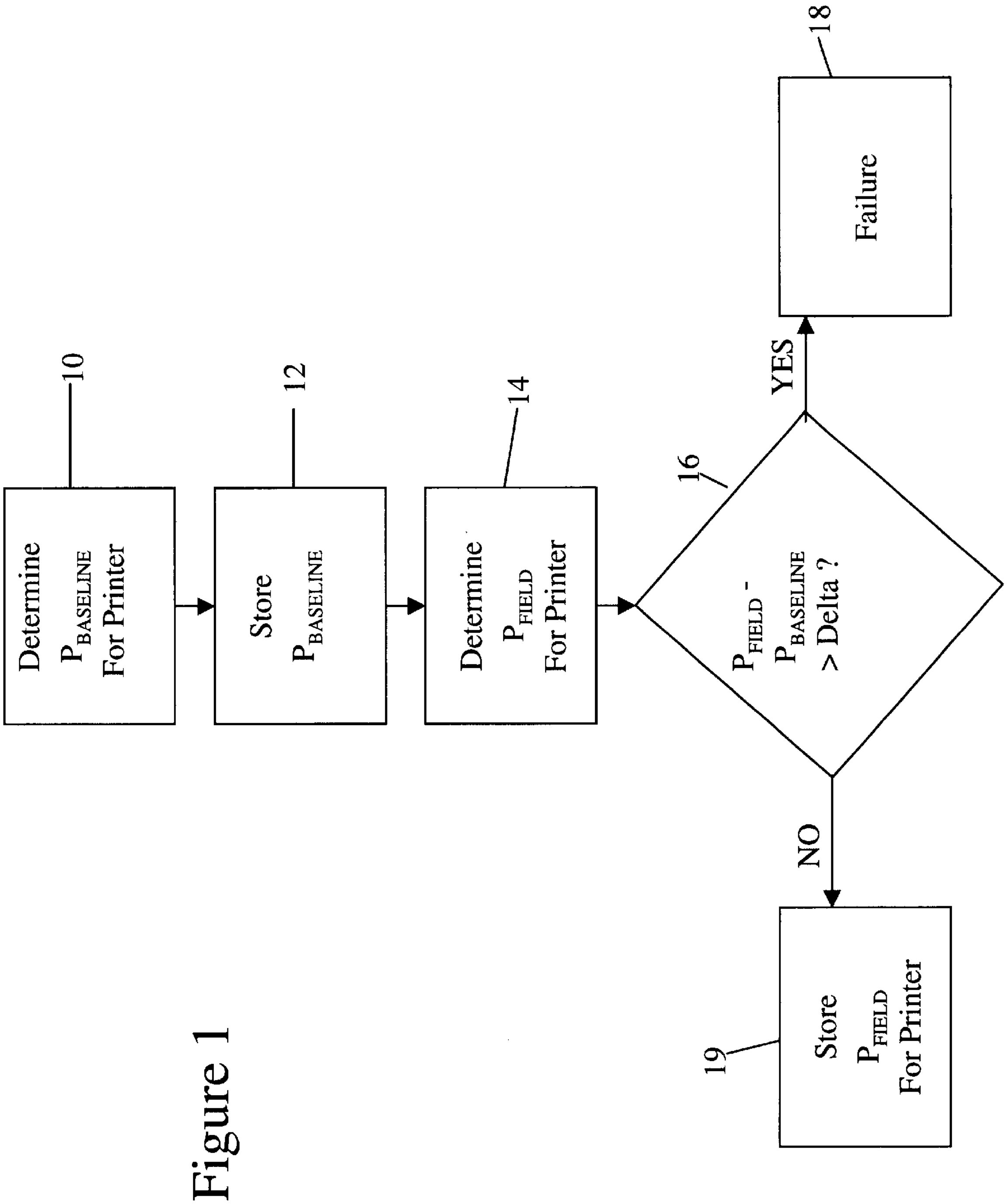
FIG. 1 is a flow chart showing a method of diagnosing a printer according to the invention.

A method according to the invention is illustrated by the flow chart of FIG. 1. When a printer comes off the manufacturing line, after final inspection, a series of parametric tests are performed on the printer and for each test, a baseline test result, $P_{BASELINE}$, is generated (step 10). These results are stored, typically, in a central database at the factory or a service center (step 12). When a service technician is called to service a particular printer, the service technician performs the same set of parametric tests at the printer to generate, for each test, a field measured test result, $P_{FIELD}$ (step 14). As described above, the parametric tests may be built into the printer or the parametric tests may be downloaded into the printer (or to a local computer or server connected to the printer). The difference between $P_{FIELD}$ and $P_{BASELINE}$ is calculated for each test and compared with the maximum parametric test variation, Delta, for each test (step 16). If the difference is greater than the Delta for that particular test, then a failure is indicated (step 18). The failure indicated is the failure associated with the particular test. If the difference is less than Delta, then no failure is indicated. Optionally, the $P_{FIELD}$ may be stored to keep a history of performance of that printer (step 19). The optionally stored historical data may be used to indicate or predict a potential failure if the differences for each successive $P_{FIELD}$ and $P_{BASELINE}$ approach the Delta for a particular test.

As discussed above, parametric diagnostic test results gathered during manufacturing from a pool of printers was available to service technicians but provided little assistance in troubleshooting because the range of test results for the population of products is so great. For example, the population of printers may produce, for a particular parametric test, a range of 650 to 980 for the result. For a single printer in that population the baseline number may be 960, and when a failure is introduced, it may change the result to 730. A change from 960 to 730 (a delta of 330) is easily distinguished as a failure for this printer, even though 730 still falls into the range of acceptable results for the whole population of printers. Even obtaining average values for a particular product/variation from normal or average value may not accurately tell a technician if a particular printer is working acceptably.

In the method of the invention, baseline test data is obtained for each individual printer. Field measurements are made to determine any changes in parametric test data which is then used to calculate a difference. To make the difference value useful for troubleshooting, fault insertion testing is done to characterize changes in test results. This information is then published in service documentation for troubleshooting use.

Figure 2:
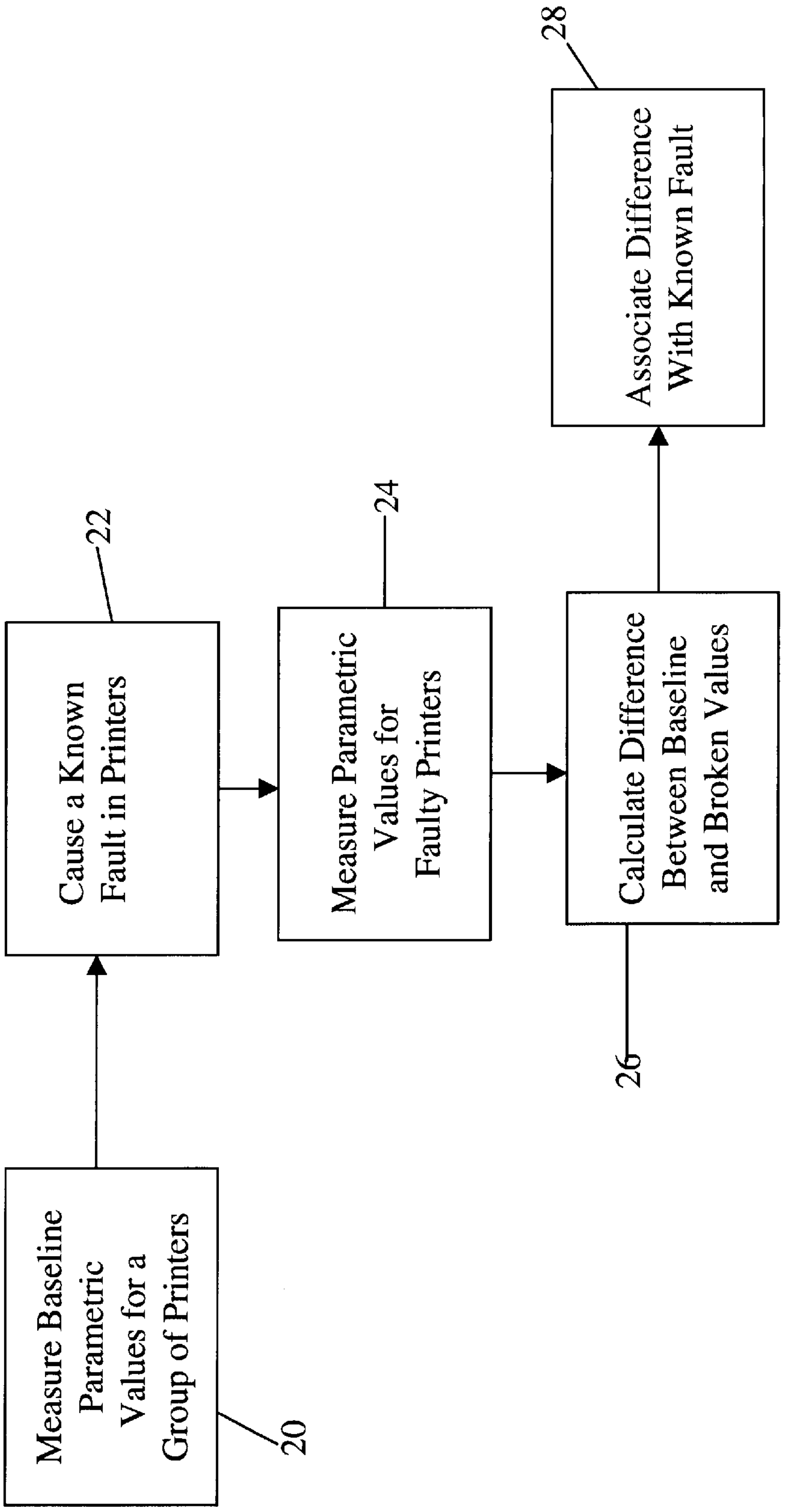
FIG. 2 is a flow chart showing a method of determining a maximum variation for a particular parameter in a printer.

FIG. 2 is a flow chart of a method for determining a Delta for a particular printer fault for a particular printer type (called fault insertion testing, where a known fault is inserted into a functioning printer). A group of printers (at least one) of a particular type is selected. A set of parametric tests is measured for the group and a set of baseline values for each test and for each printer is determined (step 20). Then at least one of the printers is broken in a known manner or a known failure is applied to the printer (step 22). The same set of parametric tests is performed on the broken printer and the parametric values determined (step 24). The difference between the post break measurements and the baseline measurements is calculated (step 26). At least one of the calculated Deltas will be significantly larger than the other values. The test with the largest Delta is used as an indication of the known failure and this Delta is associated with that failure (step 28). For example, the Phaser 860 printer has a particular part that wears down over time. The DM Axis Performance parametric test is able to measure the timing of the motion of this piece. By running the test both in a new condition and again after inserting worn parts, the delta can be identified for this failure condition. For a particular printer the DM Clutch Disengage Time result for a worn piece was 13. With a new piece the result was 9. An increase (from the new state) of 4 or greater indicates a failure for this piece. The traditional method of comparing this result against a population of products would not have worked as the results for this test across new (non-worn) printers range from 3 to 16. Further fault insertion testing across more printers will increase the confidence in this result.

The method of the invention enhances troubleshooting by analyzing changes in parametric test data from the time of manufacturing until a failure event. A set of diagnostic tests may be built-in to the printer so that they can be performed at any time during the life of the printer. These same tests are performed during the verification test process in manufacturing to ensure quality before being shipped to a customer. The results of the manufacturing tests are stored in a database where they can be collected based on some identifier, such as the product serial number. When a customer calls in with a problem, the support person can query the test results from manufacturing and add them to the service record. The support person can then have the customer run the diagnostics and have the results returned via the internet for comparison, or if a field technician is dispatched to the site, they can run the tests and compare the results with the data in the service record.

The method of the invention provides service personnel with the means to troubleshoot a current printer problem by performing a comparison between two sets of parametric test data for that individual product; one data set collected in the manufacturing process and the second set collected in real-time. The method of the invention reduces service costs by improving the speed and accuracy of diagnosis.

The invention may be used alone or in combination with the system and methods described in co-pending, co-assigned patent applications D/A1149, System and Method for Automated Printer Diagnostics, Russell S. Neville, and D/1150, Method for Analyzing Printer Faults, David I. Bernklau Halvor, filed the same date as this application, which are incorporated herein by reference.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method of diagnosing a printer, wherein the printer is one of a particular type, comprising:

performing a series of parametric tests on the printer at the time of manufacture to generate a set of baseline values for the printer;

storing the baseline results;

generating a set of maximum parametric test variations for the printer type such that each maximum parametric test variation is associated with a particular printer fault event;

performing the series of parametric tests on the printer at a time of a suspected printer fault to generate a set of suspected fault values;

calculating, for each of the parametric tests, the difference between the suspected fault value and the baseline value;

wherein, if the difference for a particular parametric test is greater than the maximum parametric test variation for that particular parametric test, the particular print fault event associated with the parametric test variation may be indicated.

2. The method of claim 1, wherein the baseline results are stored remotely from the printer.

3. The method of claim 1, wherein the printer includes software for performing the parametric testing.

4. The method of claim 3, wherein the step of performing the series of parametric tests at the time of a suspected printer fault is performed by remotely accessing the printer.

5. The method of claim 1, further comprising: storing the set of suspected fault values for the printer.

6. The method of claim 1, wherein the set of maximum parametric test variations is generated in accordance with the following:

providing at least one other printer of the same printer type;

performing at least one parametric test on the other printer at the time of manufacture to generate a baseline value for that parametric test for the other printer;

causing a fault of a known type in the other printer;

performing the parametric test on the other printer to generate a fault value;

calculating the difference between the fault value and the baseline value;

associating the difference with the fault of the known type.

7. The method of claim 6, further comprising:

providing a plurality of printer of the same type;

repeating the subsequent steps for each of the plurality of printers;

averaging the differences for the plurality of printers; and associating the average difference with the fault of the known type.

* * * * *